US 8,857,833 B2

(12) United States Patent
Deierling et al.

(10) Patent No.: US 8,857,833 B2
(45) Date of Patent: Oct. 14, 2014

(54) VEHICLE KNUCKLE WITH BOLT-ON STEER ARM (71) Applicant: Dana Automotive Systems Group, LLC, Maumee, OH (US)

(72) Inventors: Phillip E. Deierling, Toledo, OH (US); Stoyan I. Stoychev, Sylvania, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 13/663,523

(22) Filed: Oct. 30, 2012

(65) Prior Publication Data
US 2013/0119628 A1 May 16, 2013

Related U.S. Application Data (60) Provisional application No. 61/559,770, filed on Nov. 15, 2011.

(51) Int. Cl.
*B62D 7/18* (2006.01)

(52) U.S. Cl.
CPC .............. *B62D 7/18* (2013.01); *B60G 2206/50* (2013.01)
USPC .................................................. 280/93.512

(58) Field of Classification Search
CPC . B62D 7/18; B60G 2206/50; B60G 2204/148
USPC .................................................. 280/93.512
See application file for complete search history.

(56) References Cited

U.S. PATENT DOCUMENTS

| 1,932,340 | A | * | 10/1933 | Goltry ....................... 280/93.512 |
| 2,771,302 | A | * | 11/1956 | Booth et al. ............. 280/93.512 |
| 4,674,760 | A |   | 6/1987 | Goulart |
| 5,022,673 | A | * | 6/1991 | Sekino et al. .......... 280/124.138 |
| 5,219,176 | A |   | 6/1993 | Mitchell |
| 5,458,352 | A |   | 10/1995 | Lederman |
| 5,624,011 | A | * | 4/1997 | White et al. .................. 188/329 |

(Continued)

FOREIGN PATENT DOCUMENTS

| DE | 102009012135 A1 | 9/2010 |
| GB | 772717 A * | 4/1957 |

(Continued)

OTHER PUBLICATIONS

Klaus Gell, Steering Knuckle of a Single-wheel Suspension of a Motor Vehicle, Jul. 23, 2009, WIPO, WO 2009/089962 A1, Machine Translation of Description.*

(Continued)

*Primary Examiner* — James English
(74) *Attorney, Agent, or Firm* — Marshall & Melhorn, LLC (57) ABSTRACT

A vehicle steering knuckle has an inward contact surface that is attached to a vehicle steer arm that has an outward contact surface, by way of at least one bolt extending through aligned holes in the knuckle and into the steer arm. The bolt connects the knuckle to the steer arm, from a side of the knuckle that is opposite the steer arm. Thereby, the vehicle steering knuckle and vehicle steer arm come in contact with each other at the contact surfaces by tightening the bolt. The steer arm may have a ball bearing, dowel pin, protrusions, or cut-out extending into or out of the vehicle steering knuckle or vehicle steer arm at the contact surfaces.

11 Claims, 6 Drawing Sheets

(56) References Cited

U.S. PATENT DOCUMENTS

| | | | |
|---|---|---|---|
| 5,785,332 | A | 7/1998 | Pollock et al. |
| 6,099,003 | A | 8/2000 | Olszewski et al. |
| 6,367,825 | B1 | 4/2002 | Kilpatrick |
| 6,419,250 | B1 | 7/2002 | Pollock et al. |
| 6,612,819 | B1 * | 9/2003 | Furst et al. ............ 417/479 |
| 6,616,156 | B1 * | 9/2003 | Dudding et al. ......... 280/93.512 |
| 7,530,583 | B2 | 5/2009 | Gottschalk |
| 7,686,312 | B2 * | 3/2010 | Fuks et al. ............ 280/93.512 |
| 7,798,506 | B2 | 9/2010 | LeBlanc, Sr. et al. |
| 7,815,203 | B2 * | 10/2010 | Adleman et al. ......... 280/93.512 |
| RE42,914 | E | 11/2011 | Brinker et al. |
| 8,070,177 | B2 * | 12/2011 | Eveley .................... 280/442 |
| 2004/0232641 | A1 * | 11/2004 | Kaiser .................... 280/93.512 |
| 2007/0096419 | A1 | 5/2007 | Gercke et al. |
| 2007/0138754 | A1 * | 6/2007 | Moreau et al. ........... 280/93.512 |
| 2008/0284122 | A1 * | 11/2008 | Kwon .................... 280/93.511 |
| 2010/0140895 | A1 | 6/2010 | Kurth et al. |

FOREIGN PATENT DOCUMENTS

| | | | |
|---|---|---|---|
| JP | 08142895 A | * | 6/1996 |
| WO | 2007062684 A1 | | 7/2007 |
| WO | 2009087661 A1 | | 7/2009 |
| WO | 2009089962 A1 | | 7/2009 |

OTHER PUBLICATIONS www.ngmotorsport.com/shop/products/65.php, Brass Knuckle, Bolt on Steering Arm.
www.ngmotorsport.com/shop/products/67.php, Brass Knuckle, Hot Rod Steering Arm.

* cited by examiner

VEHICLE KNUCKLE WITH BOLT-ON STEER ARM

RELATED APPLICATION

This application claims the benefit under 35 U.S.C. §119 (e) of U.S. Provisional Patent Application Ser. No. 61/559,770, filed Nov. 15, 2011, which is incorporated by reference herein in its entirety.

FIELD OF THE INVENTION

The present invention relates to a vehicle knuckle with a steer arm. More particularly, the present invention relates to a vehicle knuckle with a bolt-on steer arm.

BACKGROUND OF THE INVENTION

Typically, a vehicle steer axle assembly has a forged steering knuckle that includes a steer arm forged therewith. An example of such a vehicle steer axle assembly is U.S. Pat. No. 5,785,332 to Pollock, which is incorporated herein by reference. In Pollock, the steer arm is unitarily forged on its outward end with the inward side of a steering knuckle.

In general, the space on the inward side of a vehicle steer axle assembly is taken up by a large number of parts that are required to be attached or connected thereto, and/or are required to be assembled thereabound. Thus, it is a complex and time intensive task to initially assemble parts, for example, vehicle brake packaging, on and around a steering knuckle with an integrally formed steer arm in this crowded space on the inward side of the knuckle. Further, repair and/or replacement of a steering knuckle with an integrally formed steer arm is similarly difficult because, if the steer arm is in need of repair or replacement, the entire knuckle must be removed or replaced.

Others have developed bolt-on vehicle steer arms. For example, as seen in prior art FIG. 13, a prior art design of a steering knuckle assembly having an arrangement of a bolt-on steer arm that is bolted to a knuckle from the inward side of the knuckle. Even with this arrangement, the steer knuckle assembly is required to be assembled, changed, and/or repaired from the crowded space on the inward side or blindly from the outward side of the knuckle.

Quite often, for either of the above-identified vehicle steering knuckle assemblies, assembly methods and/or changes in parts in the crowded inward space require offsets to be designed into a new steer arm, so that the new steer arm does not physically conflict with the other parts in the crowded inward space. As a result, a new steering knuckle having steer arms with the offset steering arm needs to be designed, tested, built, assembled, and maintained. Further, these offsets, regardless of why they are implemented, often result in increased stress at the steer arm base, where the steer arm is forged or attached with/to the steering knuckle. Consequently, the offsets can result in increased costs associated with the vehicle steering knuckle.

Therefore, what is sought is to reduce the number of steering knuckles needed, for various vehicles, by not requiring a different offset steer arm to be forged therewith or bolted thereto from the crowded inward side of the knuckle. In addition, a means needs to be provided that reduces the stress experienced by a steer arm at its outward end where it is joined with the inward side of a knuckle. In turn, brake packaging should be improved, assembly should be facilitated, the number and size of the parts to be assembled should be reduced, and the overall complexity of a steering knuckle assembly should also be reduced. As a benefit, costs associated with the knuckle, assembly, and repair of the vehicle steer axle assembly should be lowered.

SUMMARY OF THE INVENTION

A vehicle steering knuckle has a vehicle steer arm attached thereto by way of at least one bolt disposed from a side of the vehicle steering knuckle that is substantially opposite the vehicle steer arm and through aligned holes in the vehicle steering knuckle and the vehicle steer arm, wherein the vehicle steering knuckle has an inward surface and the vehicle steer arm has an outward surface. Thereby, the vehicle steering knuckle and vehicle steer arm come in contact with each other at these surfaces. At least one dowel pin, ball bearing, protrusion, or cut-out may be disposed into or out of the vehicle steering knuckle and/or vehicle steer arm at the contact surfaces. A spindle may be unitarily formed with the vehicle steering knuckle on its outward side.

Further advantages will be apparent from the following description and appended claims, reference being made to the accompanying drawings forming a part of a specification, wherein like reference characters designate corresponding parts of several views.

DETAILED DESCRIPTION OF THE INVENTION

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
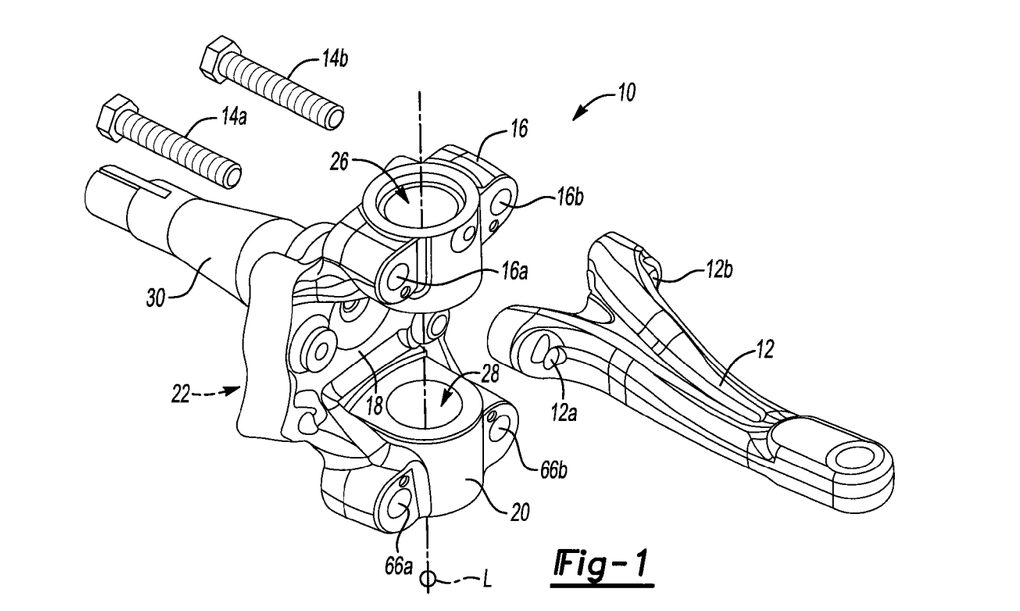
FIG. 1 is an exploded three dimensional view of a vehicle steering knuckle, with bolts and a vehicle steer arm, in accordance with the present invention.

FIG. 1 illustrates a vehicle steering knuckle 10 with a vehicle steer arm 12 and bolts 14a, 14b. The vehicle steering knuckle 10 comprises an upper portion 16, middle portion 18, and lower portion 20. A left section 22, along with a right section 24 (see FIG. 3) of the vehicle steering knuckle 10, have been removed so as to allow for better viewing (FIG. 2) of the left side of the upper portion 16 with the vehicle steer arm 12 bolted thereto, by way of the bolt 14a. Typically, packaging of brakes (not shown) is provided in these removed sections 22, 24 of the vehicle steering knuckle 10. However, the subject invention is not limited by the configuration of the removed brake packaging sections 22, 24. It is noted that the designation of left and right in this disclosure is relevant to items on one side of a vehicle (not shown but common in the art). However, the left and right designations may be reversed when used to describe the same items on an opposite side of the vehicle.

Figure 3:
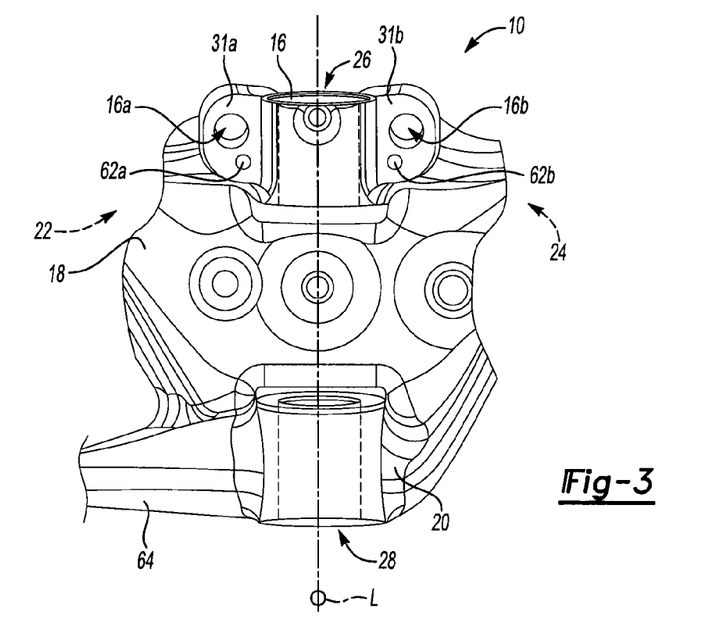
FIG. 3 is an elevational view of the inward side of a portion of the vehicle steering knuckle of FIG. 1.
Figure 4:
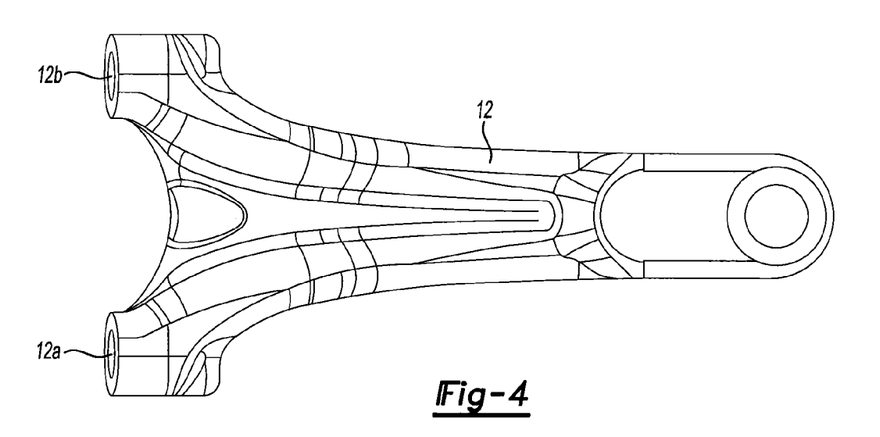
FIG. 4 is a top view of the vehicle steer arm of FIG. 1.

FIGS. 1 and 3 show the vehicle steering knuckle 10 to have upper and lower kingpin openings 26, 28. The upper kingpin opening 26 is shown formed in the inward side of the upper portion 16 of the vehicle steering knuckle 10. The lower kingpin opening 28 is also shown formed in the inward side of the lower portion 20 of the vehicle steering knuckle 10. The upper and lower kingpin openings 26, 28 are aligned along a common vertical centerline L.

Figure 5:
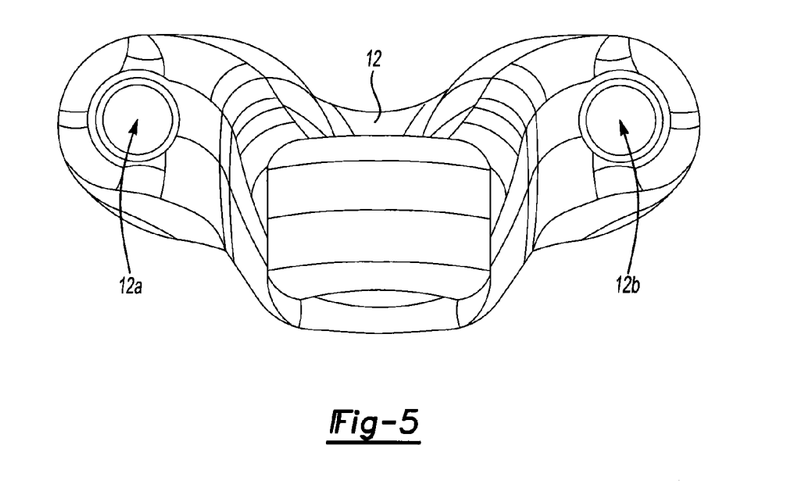
FIG. 5 is an elevational view at an inward end of the vehicle steer arm of FIG. 1.

Left and right knuckle holes 16a, 16b are disposed through the upper portion 16 of the vehicle steering knuckle 10, while being correspondingly offset horizontally to the left and right of the vertical centerline L, which is at an approximate center of the vehicle steering knuckle 10. The vehicle steer arm 12 has corresponding left and right steer arm holes 12a, 12b disposed therethrough, as further illustrated in FIGS. 5 and 6. A spindle 30 may be unitarily forged with an outward side of the vehicle steering knuckle 10.

The left steer arm hole 12a and left knuckle hole 16a are approximately horizontally aligned with each other for cooperating with the left bolt 14a, as described above. The right steer arm hole 12b and right knuckle hole 16b are approximately horizontally aligned with each other for cooperating with the right bolt 14b, as also described above.

Figure 2:
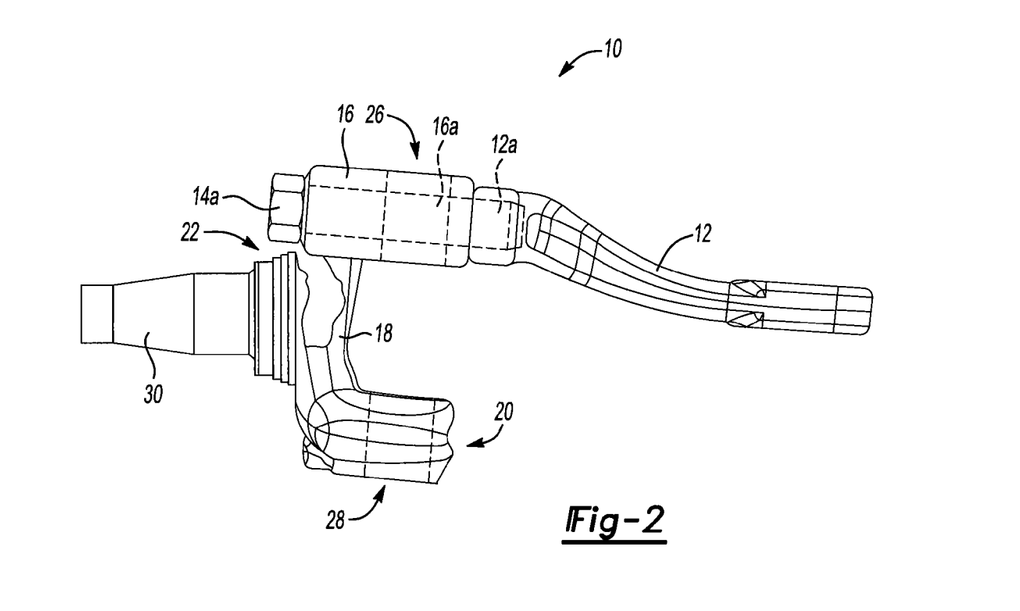
FIG. 2 is an elevational side view of an assembly of the vehicle steering knuckle and vehicle steer arm of FIG. 1.

FIG. 2 illustrates the vehicle steer arm 12 being connected to the vehicle steering knuckle 10, by way of the left bolt 14a having threads, not shown but common in the art. The left bolt 14a extends from the outward side of the vehicle steering knuckle 10 and through the left hole 16a that is disposed through the upper portion 16 of the vehicle steering knuckle 10. The left bolt 14a is then physically threaded and tightened into an aligned and like-wise cooperating threaded left hole 12a in the vehicle steer arm 12, wherein the left hole 16a may have cooperating threads therein (shown hidden therein).

In a similar manner, the right bolt 14b would extend from the outward side of the vehicle steering knuckle 10 and through the right hole 16b that is disposed through the upper portion 16 of the vehicle steering knuckle 10. The right bolt 14b would then be physically threaded and tightened into an aligned and like-wise cooperating threaded right hole 12b in the vehicle steer arm 12, wherein the right hole 16b may have cooperating threads therein (not shown). Thereby, the vehicle steer arm 12 is further attached to the upper portion 16 of the vehicle steering knuckle 10.

FIG. 3 illustrates a portion of the inward side of the vehicle steering knuckle 10. The view shown in FIG. 3 complements FIGS. 1 and 2 in that a left section 22 has been removed, so as to allow for the viewing in FIG. 2 of the side of the upper portion 16 with the vehicle steer arm 12 bolted thereto. Also illustrated in FIG. 3 is a portion of a tie rod 64 that is disposed at the lower portion 20 of the vehicle steering knuckle 10 that is illustrated in FIG. 3, on the inward side of the vehicle steering knuckle 10. The tie rod 64 could be attached to the lower portion 30 of the vehicle steering knuckle 10 by way of bolts (not shown but common in the art) that would extend into the lower portion holes 66a, 66b (see FIG. 1) of the vehicle steering knuckle 10. Unless otherwise disclosed, the subject invention is not limited by the configuration of the tie rod 64 and how it is attached to the vehicle steering knuckle 10.

FIGS. 6-12 illustrate various outward contact surfaces 32a-42a and 32b-42b on the vehicle steer arm 12 that make contact with corresponding inward contact surfaces 31a, 31b of the vehicle steering knuckle 10 (see FIG. 3). As mentioned above, the vehicle steer arm 12 is attached to the vehicle steering knuckle 10, by way of the bolts 14a, 14b that are disposed through the corresponding aligned holes 16a, 12a and 16b, 12b in the vehicle steering knuckle 10 and the vehicle steer arm 12.

The bolts 14a, 14b are sized to handle the axial load experienced by the vehicle steer arm 12 and to assure proper attachment of the vehicle steer arm 12 to the vehicle steering knuckle 10, while being simpler and less costly than a variety of steer arms 12 that would be forged with the vehicle steering knuckle 10. Also, the bolted-on vehicle steer arm 12 allows for the reduction of bolt spread across the vehicle steering knuckle 10, which in turn results in accommodating more types of brakes (not shown) that can be attached to the vehicle steering knuckle 10 and other vehicle wheel assembly applications on or surrounding the vehicle steering knuckle 10.

In general, lowering the size of the bolts 14a, 14b lowers the cost of the present invention over the mentioned prior art. However, depending on the size of the bolts 14a, 14b and the specific situation, the bolts 14a, 14b may not be able to handle a shear load placed on them by the steer arm 12. In order to eliminate the risk of slipping by the instant bolt-on vehicle steer arm 12 and/or possible loosening of the bolts 14a, 14b at the steer arm surfaces 32a, 34a, 36a, 38a, 40a, 42a and 32b, 34b, 36b, 38b, 40b, 42b, various surface additions 44, 46, 48, 50, 52, 54, 56, 58 may be added to the knuckle surfaces 31a, 31b and the steer arm surfaces 32a, 34a, 36a, 38a, 40a, 42a and 32b, 34b, 36b, 38b, 40b, 42b.

Examples of these surface additions are dowel pins 44, 46, ball bearings 48, 50, protrusions 52, 54, or cut-outs 56, 58, which may be added into or on the surfaces 31a, 32a, 34a, 36a, 38b, 40a, 42a and 31b, 32b, 34b, 36b, 38b, 40b, 42b of the vehicle steering knuckle 10 and vehicle steer arm 12, as shown in FIGS. 3 and 6-12. The cost to implement these dowel pins 44, 46, ball bearings 48, 50, protrusions 52, 54, or cut-outs 56, 58 is low in comparison to the savings afforded by implementing lower sized bolts 14a, 14b.

Figure 6:
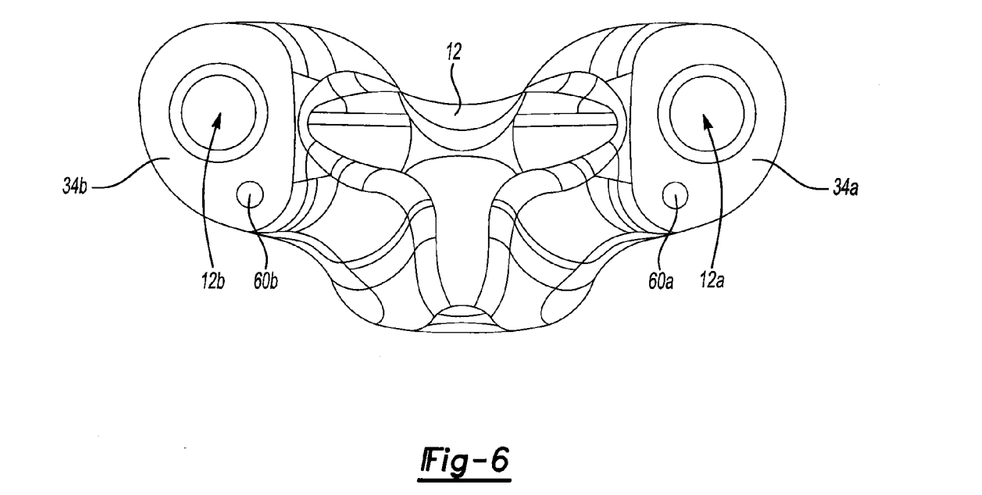
FIG. 6 is an elevational view at an outward end of the vehicle steer arm of FIG. 1.
Figure 7:
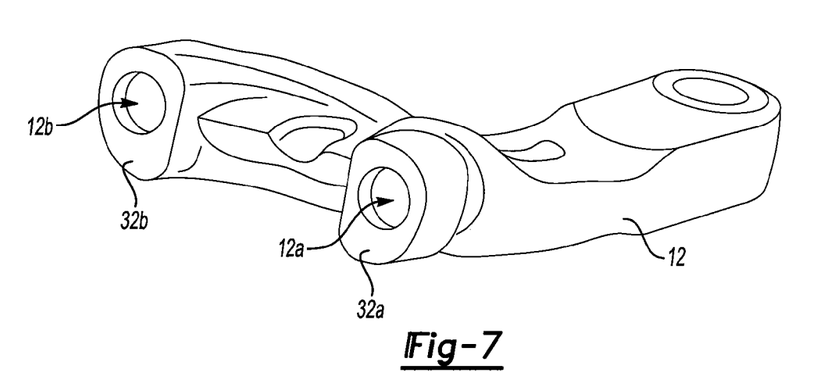
FIG. 7 is a three dimensional view of the vehicle steer arm of FIG. 1 having no surface additions.
Figure 8:
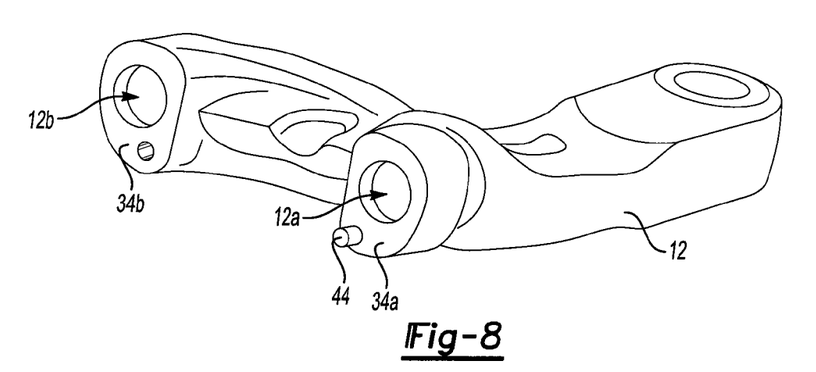
FIG. 8 is a three dimensional view of the vehicle steer arm of FIG. 1 having a dowel pin surface addition.
Figure 9:
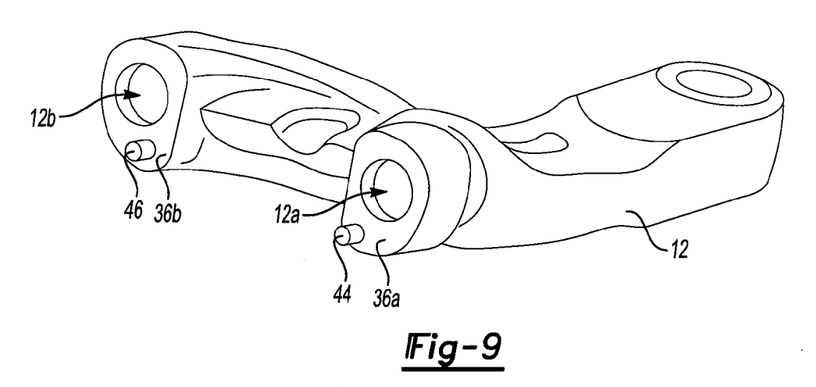
FIG. 9 is a three dimensional view of the vehicle steer arm of FIG. 1 having two dowel pin surface additions.

Specifically, FIG. 6 shows no surface additions on the contact surfaces 34a, 34b on an outward end of the vehicle steer arm 12, but FIG. 6 does show surface addition holes 60a, 60b, which are also shown but not necessarily specifically identified in FIGS. 8-11. FIG. 7 shows neither surface addition holes nor any surface additions on surfaces 32a, 32b. FIG. 8 shows the dowel pin 44 through the contact surface 34a and into the surface addition hole 60a, but there are no surface additions into the surface addition hole 60b on the contact surface 34b. FIG. 9 shows the dowel pin 44 through the contact surface 36a and into surface addition hole 60a, and the dowel pin 46 through the contact surface 36b and into surface addition hole 60b.

Figure 10:
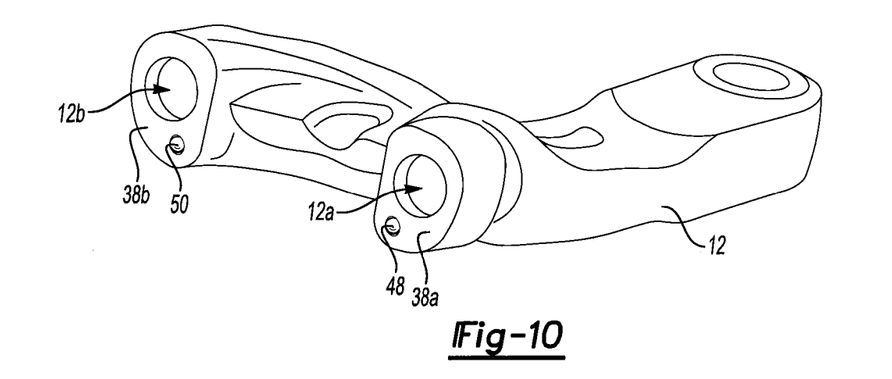
FIG. 10 is a three dimensional view of the vehicle steer arm of FIG. 1 having two ball bearing surface additions.
Figure 11:
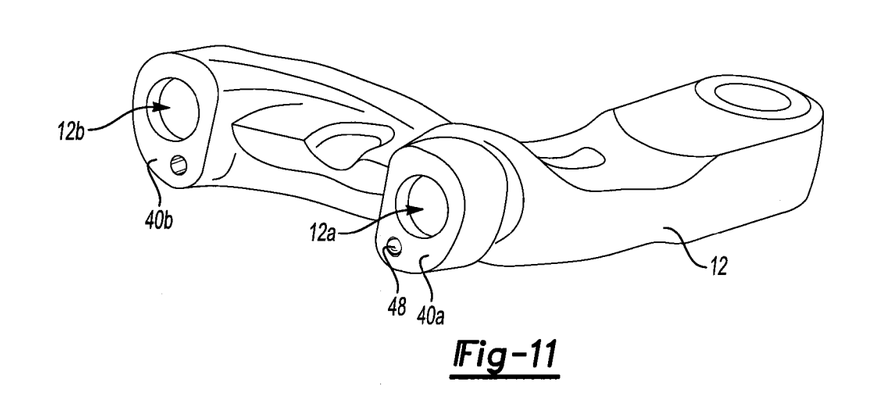
FIG. 11 is a three dimensional view of the vehicle steer arm of FIG. 1 having one ball bearing surface addition.

FIG. 10 shows the ball bearing 48 through the contact surface 38a and into the hole 60a, and the ball bearing 50 through the contact surface 38b and into the hole 60b. FIG. 11 shows the ball bearing 48 through the contact surface 40a and into the hole 60a, but no surface addition through the contact surface 40b and into the hole 60b. As seen in FIG. 3, there are complementary surface addition holes 62a, 62b provided in the vehicle steering knuckle 10, into which the dowel pins 44, 46 of FIGS. 8 and 9 and the ball bearings 48, 50 of FIGS. 10 and 11 can be disposed.

Figure 12:
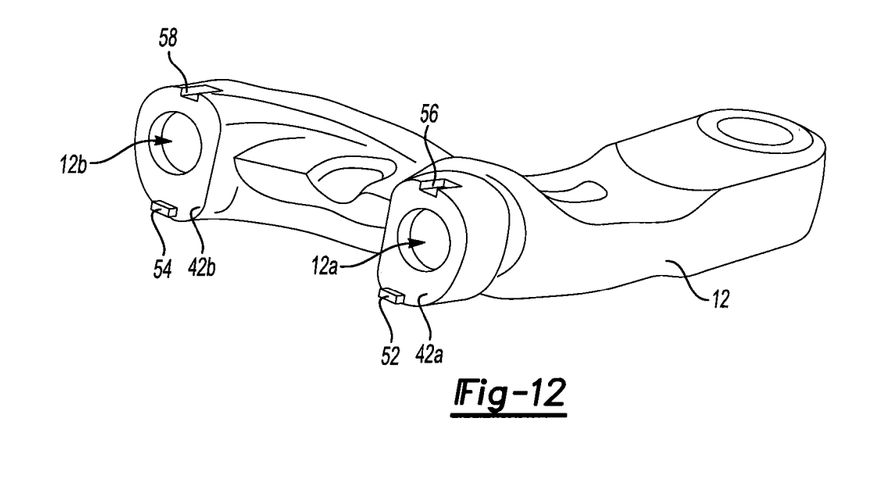
FIG. 12 is a three dimensional view of the vehicle steer arm of FIG. 1 having two cut-out and two protrusions surface additions.

FIG. 12 shows the protrusion 52 extending from the bottom of the contact surface 42a, the protrusion 54 extending from the bottom of the contact surface 42b, the cut-out 56 into the top of the contact surface 42a, and the cut-out 58 into the top of the contact surface 42b. However, any combination of the protrusions 52, 54, cut-outs 56, 58, or surface additions 44, 46, 48, 50 are possible extending from and/or protruding into any of the surfaces 31a-42a, 31b-42b.

Consequently, the above described and applied application of the surface additions 44, 58, holes 60a, 60b, 62a, 62b, and contact surfaces 31a-42a, 31b-42b can overcome the possible risk of slipping by the instant bolted-on vehicle steer arm 12, and/or possible loosening of the bolts 14a, 14b. As a result, the size and costs of the steer arm 12 and bolts 14a, 14b can be lowered significantly. This is due to the fact that the combination of the protrusions 52, 54, cut-outs 56, 58, and/or surface additions 44-58 are possible to extend from and/or protrude into any of the contact surfaces 31a, 32a, 34a, 36a, 38b, 40a, 42a and 31b, 32b, 34b, 36b, 38b, 40b, 42b, so as to handle the shear forces applied to the vehicle steer arm 12.

The above-identified invention results in less clutter and greater accessibility during installation and repair in the crowed space on the inward side of the vehicle steer axle assembly 10, especially near the vehicle steer arm 12. Also, packaging of vehicle brakes is greatly improved and redesigning offsets into the steer arm 12 is less likely. Thereby, maneuvering between the various parts in the crowded inward space is much more manageable.

Further, additional machining to the forged steering knuckle 10, especially at the inward contact surfaces 31a, 31b, is not required to accommodate changes in associated parts, which makes the attachment of the steer arm 12 to the steering knuckle 10 much stronger and reduces costs for the forged knuckle 10. Also, in contrast to the prior art steering knuckle assembly 70 that is shown in FIG. 13, by requiring the bolts 14a, 14b to be inserted and tightened or removed from the outward side (i.e., spindle side) of the steering knuckle 10, damage to the contact surfaces 31a, 32a, 34a, 36a, 38b, 40a, 42a and 31b, 32b, 34b, 36b, 38b, 40b, 42b is greatly reduced since the bolts 14a, 14b are not being blindly inserted and tightened or removed from the crowded inward space.

In addition, the instant removable steer arm 12 reduces the chances for increased stress at the steer arm base, where a conventional steer arm is forged with or inwardly bolted to a knuckle. Therefore, the removable steer arm 12 lowers the cost of the knuckle 10 and reduces the complexity of an overall knuckle/steer arm assembly 10, 12. In turn, the number and/or size of the parts should be reduced, the brake packaging is improved, and assembly is facilitated.

Figure 13:
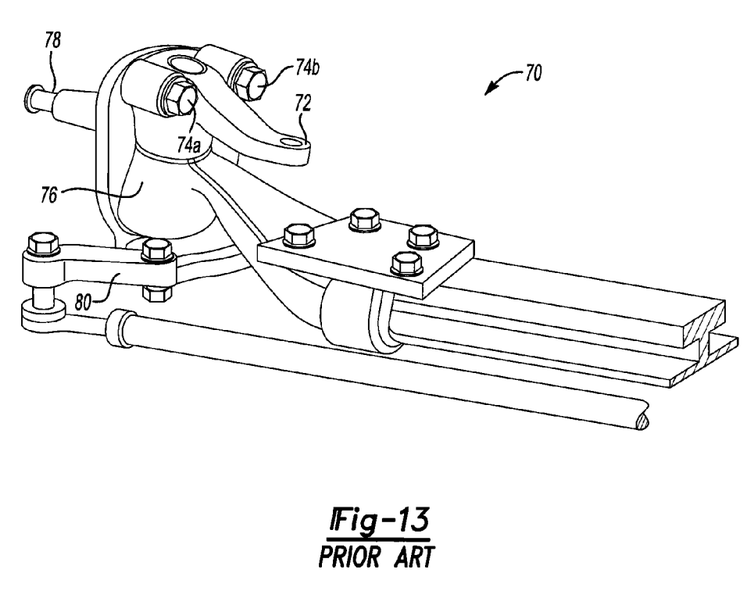
FIG. 13 is a three dimensional view of a prior art vehicle steering knuckle.

In contrast, FIG. 13 illustrates a prior art vehicle steering knuckle 70 having a bolt-on steer arm 72 that is attached by way of bolts 74a, 74b to a vehicle steering knuckle 76 (for example, Detroit Diesel). Unlike the instant vehicle steering knuckle bolts 14a, 14b, the prior art bolts 74a, 74b are disposed from the inward side of the vehicle steering knuckle 76, where the tie rod 80 is disposed. Consequently, in order to assemble, change, and/or repair the steering arm 72, the bolts 74a, 74b need to be secured or released from within the crowded inward space on the inward side of the vehicle steering knuckle 76, opposite of where the spindle 78 is disposed. For example, a packaging of brakes within the crowded inward space would be difficult for the prior art vehicle steering knuckle 70.

In other words, the prior art vehicle steering knuckle 70 comprises the vehicle steer arm 72 which is attached to the vehicle steering knuckle 70, by way of the bolts 74a, 74b disposed from the vehicle steer arm 72 side of the vehicle steering knuckle 70. This inward side of the vehicle steering knuckle 70 is crowded.

On the other hand and as stated above for the present invention, the bolts 14a, 14b are disposed from the outward side of the vehicle steering knuckle 10 where the spindle 30 is disposed. In other words, the present invention vehicle steering knuckle 10 comprises the vehicle steer arm 12 which is attached to the vehicle steering knuckle 10, by way of at least one bolt 14a or 14b disposed from the side of the vehicle steering knuckle 10 that is substantially opposite the vehicle steer arm 12. This outward side is not crowded like the inward side of the vehicle steering knuckle 10.

In accordance with the provisions of the patent statutes, the principles and modes of operation of this invention have been described and illustrated in its preferred embodiments. However, it must be understood that the invention may be practiced otherwise than specifically explained and illustrated without departing from its spirit or scope.

What is claimed is:

1. A vehicle steering knuckle, comprising a vehicle steer arm attached to the vehicle steering knuckle, by way of at least one bolt disposed from a side of the vehicle steering knuckle that is substantially opposite the vehicle steer arm and through aligned holes in the vehicle steering knuckle and the vehicle steer arm, wherein the vehicle steer arm is separate from any kingpin opening, and the vehicle steer arm has an outward contact surface and the vehicle steering knuckle has an inward contact surface that are in contact with each other.

2. The vehicle steering knuckle of claim 1, wherein the side that is substantially opposite the vehicle steer arm has a spindle unitarily formed with the vehicle steering knuckle.

3. The vehicle steering knuckle of claim 2, wherein the spindle is disposed on the outward side of a vehicle.

4. The vehicle steering knuckle of claim 1, further comprising a second bolt disposed through additional aligned holes in the vehicle steering knuckle and the vehicle steer arm, wherein the vehicle steer arm has another outward contact surface and the vehicle steering knuckle has another inward contact surface that are in contact with each other.

5. The vehicle steering knuckle of claim 4, wherein the knuckle has separate upper and lower kingpin openings.

6. The vehicle steering knuckle of claim 5, wherein the two bolts are disposed through the upper portion of the knuckle and correspondingly offset horizontally right and left of the vertical centerline of upper and lower kingpin openings.

7. The vehicle steering knuckle of claim 4, wherein the second bolt is disposed from the side of the vehicle steering knuckle that is substantially opposite the vehicle steer arm.

8. The vehicle steering knuckle of claim 7, wherein at least one dowel pin, ball bearing, protrusion, or cut-out being disposed into or out of the vehicle steering knuckle and/or vehicle steer arm at the contact surfaces.

9. The vehicle steering knuckle of claim 1, wherein the bolt has threads on the inward end that cooperate with corresponding threads in the vehicle steer arm to physically attach the steer arm to the knuckle.

10. The vehicle steering knuckle of claim 1, wherein the steer arm is attached to the upper portion of the vehicle steering knuckle.

11. The vehicle steering knuckle of claim 1, further comprising a tie rod disposed thereon at a lower portion of the vehicle steering knuckle.

\* \* \* \* \*